Nov. 26, 1963  S. W. ALDERFER  3,112,163
PROCESS FOR MAKING MAGNETIC FACED FOAM ARTICLES
Filed Sept. 21, 1959  2 Sheets-Sheet 1

INVENTOR.
STERLING W. ALDERFER
BY
ATTORNEYS

Nov. 26, 1963  S. W. ALDERFER  3,112,163
PROCESS FOR MAKING MAGNETIC FACED FOAM ARTICLES
Filed Sept. 21, 1959  2 Sheets-Sheet 2
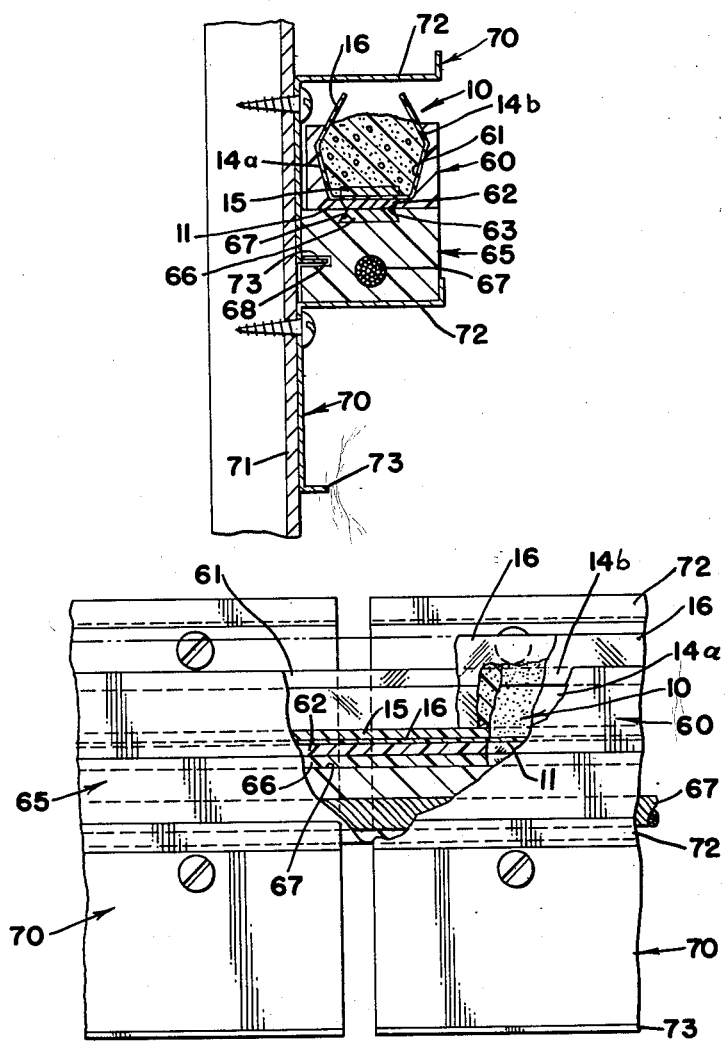
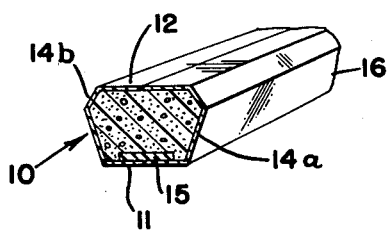
FIG. 8
INVENTOR.
STERLING. W. ALDERFER
BY
ATTORNEYS United States Patent Office 3,112,163
Patented Nov. 26, 1963

3,112,163
PROCESS FOR MAKING MAGNETIC FACED
FOAM ARTICLES
Sterling W. Alderfer, 464 N. Portage Path, Akron, Ohio
Filed Sept. 21, 1959, Ser. No. 841,328
2 Claims. (Cl. 18—59)

The present invention relates to the manufacture of flexible foamed cellular polymers. More particularly, the invention relates to the production of articles of resilient foam materials, such as polyurethane or "urethane," which are particularly suited for use as gasket or sealing members. Specifically, the invention includes within its scope the manufacture in any desired length, of a resilient foam material which as an article is magnetically adherent and which may be used as a gasket for sealing refrigerator doors.

It is a general object of the present invention to provide improved concepts for the production on a commercial scale of flexible foamed cellular polymers of any desired length which are then ready for use without need for further processing.

Further, it is an object of the invention to provide improved concepts for the production of flexible foamed cellular polymers, such as urethane foams, using low-cost equipment which is well adapted for continuous and large volume production.

Still further, it is an object to provide improved flexible foamed cellular polymer articles, specifically flexible urethane foam articles in any desired length, adapted for use as magnetically adherent gasket or sealing members.

Other uses of the concepts and articles of the invention, the advantages thereof and further objects, all will be apparent in view of the following detailed description and attached drawings.

In the drawings:

FIG. 6 is a sectional view showing still another form of apparatus for production of a flexible foamed cellular polymer article;

FIG. 7 is a side view of the apparatus of FIG. 6; and

FIG. 8 is a perspective view of an article produced by using the apparatus of FIG. 6.

Figure 5:
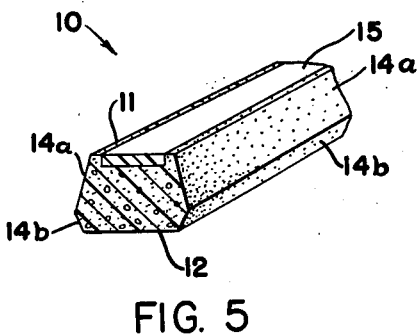
FIG. 5 is a perspective view of an article produced by using the apparatus of FIG. 1 or FIG. 4.

An article of a flexible foamed cellular polymer, such as a urethane foam, is indicated generally at 10. An article 10 is a strip or non-rigid block, of any desired length, having a face portion 11 and a base portion 12. As best shown in FIG. 5, each side of the foam strip 10 may have intersecting or outwardly tapered flat surfaces 14a and 14b which will provide sealing effect if the article is used as a gasket or sealing member. Secured or adhered longitudinally to the face portion 11 of the strip 10 is a permanently magnetized flexible strip 15 which has been specially compounded and extruded in the desired shape.

The foam article 10 shown in FIG. 8 is similar to the article of FIG. 5, but with the addition of a flexible cover sheet 16 which completely encases the foam core or center and has edges joined preferably along the length of the base portion 12 of the article.

In a broad sense, the foam core of the article 10 may be formed by reactant materials selected from those known classes of compounds which will chemically foam or react, alone or in combination with others, with or without a catalyst or a gasifiable substance, so as to form a resilient foam material having a defined cellular structure.

The preferred material for the foam core of an article 10 is an isocyanate, polyurethane, or "urethane" foam produced by reacting diisocyanates with a suitable polyol or mixture of polyols. Foaming is caused by evolution of carbon dioxide, which is liberated internally when measured amounts of water are added to an isocyanate-polyol mixture. Depending on the type of polyol selected and its ratio to isocyanate, foams of various densities ranging from less than 1 to more than 40 lb./cu. foot may be obtained.

The diisocyanate of greatest commercial importance today is TDI (tolylene diisocyanate) which consists of two common isomers. The mixture most commonly used contains 80% of the 2,4 isomer and 20% of the 2,6 isomer. This is the preferred composition because it is the product resulting from the dinitration of toluene, reduction and phosgenation.

A diisocyanate may be reacted with polyesters, polyethers, castor oil, simple glycols, drying oils and other similar compounds which are poly functional and hydroxyl-rich. The polyesters are preferred because their urethane foams have a high tensile strength and at the present state of the art are the easiest to produce. A recent variation on the polyester-based foams has been the use of dimer acids, formed by the reaction of linoleic acid in the presence of an alkali. Urethane foams based on the dimer acids are highly resistant to hydrolytic agents and exhibit a high degree of resilience to prolonged periods. If practice of the invention requires a high degree of low temperative flexibility, the polyether-based foams may be used.

The preparation of a suitable urethane foam for practice of the invention as disclosed therein is deemed well within the abilities of those skilled in this art. However, by way of example, a suitable formulation would include 25 parts of diisocyanate, 100 parts of polyester, 8 to 10 parts of water, and 1 to 3 parts of a catalyst (such as triethyl amine). The ingredients may be all mixed at one time, with good agitation, and just as the evolution of $CO_2$ begins, the liquid mixture is poured into the cavity of the mold 20, described in detail below. The foaming reaction will proceed without the application of heat or pressure.

The permanently magnetized flexible strip 15, associated with the face portion 11 of the foam strip, is a recently developed product of the B. F. Goodrich Co., Akron, Ohio, as is distributed under the name "Koroseal Flexible Magnetic Strip." Insofar as can be determined, the product is plasticized vinyl resin based material having magnetizable particles embedded therein. The product is extruded in strips of any desired length and cross-sectional shape. The product is actually an electrical insulator but unlike iron-type magnets, it can be spot-magnetized or shape-magnetized for the most efficient use. For example, the material can have poles across the width of thickness, or along one face with the two poles along the edge, or along one face with alternating poles, or in long continuous lengths. For purposes of the present invention, the preferred arrangement is one where the North pole runs contiuously the length of the strip on one edge and the South pole runs continuously on the opposite edge.

The flexible sheet 16 covering the foam core as shown in FIG. 8, is preferably a non-rigid film of polyvinyl chloride, manufactured by calendering, casting, or extrusion and having a preferred thickness of 5 to 10 mils.

Such films are well known to the art and may be provided with textured or decorative surfaces as desired. Other non-rigid plastic films, such as polyethylene, or flexible fabric sheeting, such as cotton duck could also be used if desired.

Figure 1:
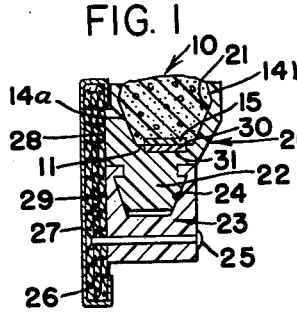
FIG. 1 is a sectional view showing one form of apparatus for production of a flexible foamed cellular polymer article according to the invention.
Figure 2:
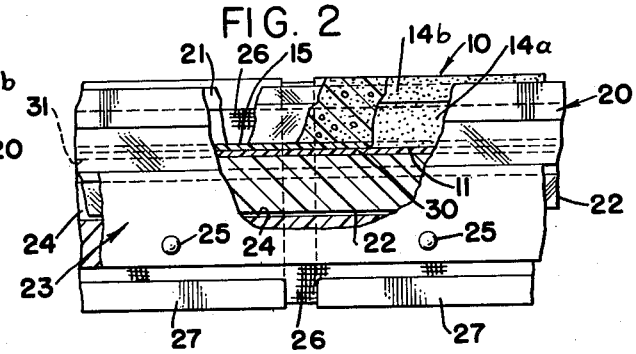
FIG. 2 is a side view of the apparatus of FIG. 1.

Referring to FIGS. 1 and 2, the foam article 10 is prepared from a suitably formulated reactant mixture (described above) mixed in suitable equipment (not shown). The reactant mixture is poured through suitable charging nozzles or spouts (also, not shown) into an open top mold indicated generally at 20.

The mold 20 is preferably a polyethylene compound formed by conventional techniques; for e.g., at a die melt temperature of about 300° F. under a die melt pressure of 500–1500 p.s.i. The mold 20 is of any desired length and having an open top mold cavity 21 conforming dimensionally with the cross-sectional shape of the foam article 10. The overall length of an article 10 is determined by the length of the mold cavity 21 and the extent to which it is longitudinally filled (or charged) with a reactant mixture capable of forming the foam. The underside of the mold 20 has a keystone shaped portion 22 for detachable engagement of the mold 20 with a longitudinally coextensive carrier block indicated generally at 23.

The carrier block 23 is preferably a polyvinyl chloride compound formed by conventional techniques; for e.g., at a stock temperature of 320–400° F. under a pressure of 1000–3000 p.s.i. The carrier block 23 has an open top and sides defining a keystone shaped recessed portion 24 for detachable longitudinal engagement with the extension portion 22 of the mold 20.

The mold carrier 23 is attached as by the rivets indicated at 25, to the exposed faces of a continuous or long belt 26 supported at spaced intervals by C-shaped clips or guides supports 27 attached to building or structural members (not shown). A belt 26 is preferably of reinforced fabric or fabric-rubber composition, and may be driven by suitable means (not shown) so as to move the mold carrier 23, with the attached mold 20, to and beyond the location of the nozzle (not shown) for depositing or charging the reactant mixture in the mold cavity 21. The belt 26 should be of sufficient length in a continuous substantially horizontal plane so that the foam mixture will remain level within the cavity 21 until the foam forming reaction has run substantially to completion. The clips or guides 27 may be fabricated of metal and when vertically disposed at horizontally spaced intervals by attachment to suitable structural members serve to maintain the belt 26 in an upright position and in a horizontal or level plane during the foam forming reaction. The inside surfaces 28 and 29, respectively, of the mold 20 and carrier 23, are preferably true vertical to conform with the outer surface of the belt 26.

The preferred form of foam article 10 has a permanently magnetized flexible strip 15 as an integral part thereof. It has been found that foamed in situ materials, such as the urethanes, possess properties of strength and resilence such that the magnetic strip 15 may be inserted or located within the mold cavity 21 before charging of the reactant mixture and will become adhered to the foam and remain attached thereto upon removal from the mold cavity. The magnetic strip 15 is positioned within the mold cavity by attraction to an appropriately magnetized similar length of strip 30 positioned longitudinally along the bottom of the mold cavity. In practice, the lower strip 30 need not be attached in place but may merely seat in an appropriate channel 31 provided for that purpose. When the foam forming reaction has run, the magnetically attracted strips 15 and 30 are lifted together free of the mold 20, the mold strip 30 is then detached and replaced in position, and the article 10 is ready for use. It will be seen that the cooperative action between the magnetic strips 15 and 30 is such that the article strip 15 is exactly positioned and that the temporary removal of the mold strip 30 from channel 31 frees the foam article 10 from the mold cavity 21.

Figure 3:
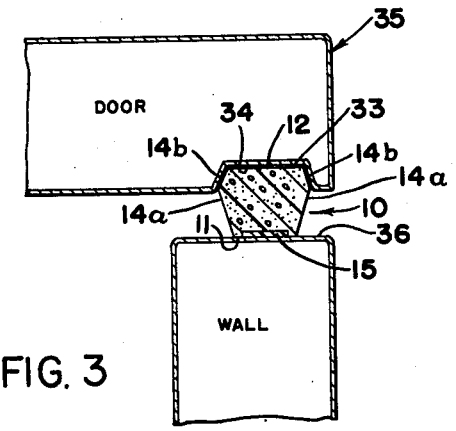
FIG. 3 is a plan view showing use of the article produced according to FIG. 1 as a gasket member.

FIG. 3 shows the use of a length of article 10 as a gasket or sealing member. The base 12 is attached, as by a suitable adhesive layer 33, to a preferably recessed marginal portion 34 of a door 35. The magnetized strip 15 will magnetically adhere to an "armature" or iron-containing wall portion 36. The construction shown is considered particularly suitable for use on refrigerator or ice box doors, though other uses will suggest themselves.

Figure 4:
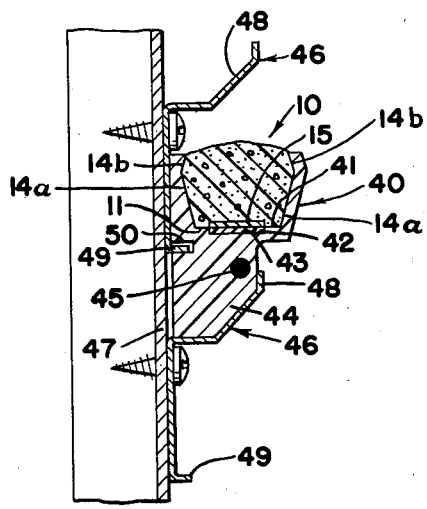
FIG. 4 is a sectional view showing another form of apparatus for production of a flexible foamed cellular polymer article.

Referring to FIG. 4, the foam article 10 may be produced in a movable one-piece mold and carrier indicated generally at 40. The mold and carrier 40 is preferably an extruded polyethylene compound, as described above. The mold cavity 41 has an open top and conforms dimensionally with the cross-sectional shape of the article. The overall length of an article 10 is determined by the length of the mold cavity 41 and the extent to which it is longitudinally filled with a reactant mixture capable of forming the foam. The mold magnetic strip 42 seats within an appropriate channel 43 extending along the lower surface of the mold cavity 41. The carrier portion 44 beneath the mold portion 40 is preferably reinforced with a cord strand 45 and has a slide surface which fits within a flanged metal support, indicated generally at 46, attached at spaced intervals to building or structural members such as indicated at 47.

Each support 46 has an upper portion 48 adapted to receive the outer and lower side walls of a carrier portion 44. The lower portion of each support 46 preferably terminates in a right-angled rib 49 which fits within a groove or channel 50 extending along the inside surface or face of the mold and carrier 40. As shown in FIG. 4, the upper portion 48 of a support 46 receives the carrier portion 44 on one mold and carrier 40 while the lower portion and rib 49 is engaged within the channel 50 of a second mold and carrier 40. A suitable drive means (not shown) is provided to move the carrier portion 44, and the mold 40, to and beyond the location of the nozzle (not shown) for depositing the reactant mixture. With the construction shown, it is possible to provide for multiple banks of molds and carriers 40, stacked vertically one above the other in close proximity, yet without interference, for deposit of the reactant mixture into a specific mold, selective horizontal movement of a specific mold during the reaction period, or removal of lengths of the finished article.

The apparatus embodiment shown in FIGS. 6 and 7 is a movable two-piece mold and carrier unit. The mold 60 is preferably an extruded polyethylene compound, as described above, and has an open top cavity 61 conforming dimensionally with the cross-sectional shape of the foam article 10. The overall length of an article 10 is determined by the length of the mold cavity 61 and the extent to which it is longitudinally filled with a reactant mixture capable of forming the foam. Whereas, in the embodiments described above, the flush seated mold magnetic strip (30 or 42) was removable from a channel (31 or 43) extending along the lower surface of the mold cavity, in this form the mold magnetic strip 63 is adapted for secure insertion within a channel 63. This construction permits the mold cavity 61 to be lined with a cover sheet 16, as described above, which is maintained in position by attraction of the article magnetic strip 15 to the permanently attached mold strip 62. When the reactant mixture is charged into the mold cavity, the article of FIG. 8 is produced, requiring only sealing of the edges of the cover sheet 16 by suitable means.

The carrier block 65 may be either a polyethylene or a polyvinyl chloride compound as described above. The upper surface of the preferably rectangular in cross-section carrier block has a magnetic strip 66 adapted for secure insertion within a channel 67. The attraction between strip 66 and the carrier strip 62 provides for detachable engagement of the mold 60 and block 65. The medial portion of the carrier block 65 is preferably reinforced with a cord strand 67. On the inside surface or face of the block 63 is a groove or channel 68. The carrier block 65 is slidable within a flanged metal support, indicated generally at 70, attached at spaced intervals to building or structural members such as indicated at 71.

Each support 70 has an upper portion 72 adapted to receive the outer and lower side walls of a carrier block 65. The lower portion of each support 70 preferably terminates in a right-angled rib 73 which fits within the carrier block channel 68. As shown in FIG. 6, the upper portion 72 of a support 70 receives one carrier block 65 while the lower portion and rib 73 is engaged within the channel 68 of a second carrier block 65. A suitable drive means (not shown) is provided to move the carrier block 65, with the attached mold 60, to and beyond the location of the nozzle (not shown) for depositing the reactant mixture. With the construction shown, it is possible to provide for multiple banks of molds 60 and carrier blocks 65, stacked vertically one above the other in close proximity yet without interference for deposit of the reactant mixture into specific molds, selective horizontal movement of a specific mold during the reaction period, or removal of the finished article.

As has been shown, the concepts of the present invention will greatly improve the art relating to the production of flexible foamed cellular polymers and articles produced thereby will have a wide variety of practical uses. Accordingly, the scope of the invention should be delineated only by the scope of the appended claims.

What is claimed is:

1. The process of producing a resilient foam strip with a strip of flexible magnetized material embedded in its bottom surface, which process comprises providing a strip mold of non-magnetic material having a cavity of the shape of the foam strip with an additional longitudinal recess in its bottom of the same width as the strip of flexible magnetized material, inserting in the recess a strip of material attractible by a magnet to fill the recess and establish the desired mold shape, placing in the mold the said strip of flexible magnetized material to cover and be held by the strip of material attractible by a magnet, filling the cavity with a settable resilient foam composition adherent to the flexible magnetized material, setting the foam, and removing from the mold the set foam strip with the flexible magnetized material embedded in it and separating it from the material attractible by a magnet.

2. The process of producing a resilient foam strip with a strip of flexible magnetized material embedded in its bottom surface and a continuous skin covering its entire surface, which process comprises providing a strip mold of non-magnetic material having a cavity of the shape of the foam strip with an additional longitudinal recess in its bottom of the same width as the strip of flexible magnetized material, inserting in the recess a strip of material attractible by a magnet to fill the recess and establish the desired mold shape, lining the mold with a film suitable for forming a continuous skin covering the final strip, placing in the mold within the lining of film the said strip of flexible magnetized material to be held by the strip of material attractible by a magnet, filling the cavity with a settable resilient foam composition adherent to the skin and to the flexible magnetized material, setting the foam, and removing from the mold the set foam strip with the flexible magnetized material embedded in it and the skin covering it and separating it from the material attractible by a magnet.

References Cited in the file of this patent

UNITED STATES PATENTS

| | | |
|---|---|---|
| Re. 24,914 | Koenigsberg | Dec. 20, 1960 |
| 2,215,515 | Matheny | Sept. 24, 1940 |
| 2,271,058 | Binns | Jan. 27, 1942 |
| 2,394,327 | Niessen et al. | Feb. 5, 1946 |
| 2,465,276 | Ryder | Mar. 22, 1949 |
| 2,659,114 | Anderson et al. | Nov. 17, 1953 |
| 2,668,987 | Harris et al. | Feb. 16, 1954 |
| 2,705,344 | Salomone et al. | Apr. 5, 1955 |
| 2,753,642 | Sullivan | July 10, 1956 |
| 2,767,461 | Lebold et al. | Oct. 23, 1956 |
| 2,898,634 | Alderfer | Aug. 11, 1959 |
| 2,931,063 | Harris | Apr. 5, 1960 |
| 2,959,832 | Baermann | Nov. 15, 1960 |
| 2,972,784 | Shonka et al. | Feb. 28, 1961 |
| 3,011,218 | Mitten | Dec. 5, 1961 |
| 3,028,631 | Cook | Apr. 10, 1962 |

FOREIGN PATENTS

| | | |
|---|---|---|
| 556,396 | Great Britain | Oct. 4, 1943 |